(12) United States Patent
Camp

(10) Patent No.: US 9,874,200 B2
(45) Date of Patent: Jan. 23, 2018

(54) LIFTING SYSTEM AND METHOD

(71) Applicant: Billy D. Camp, Leander, TX (US)

(72) Inventor: Billy D. Camp, Leander, TX (US)

( * ) Notice: Subject to any disclaimer, the term of this patent is extended or adjusted under 35 U.S.C. 154(b) by 0 days.

(21) Appl. No.: 15/289,891

(22) Filed: Oct. 10, 2016

(65) Prior Publication Data
US 2017/0022980 A1    Jan. 26, 2017

Related U.S. Application Data

(63) Continuation of application No. 14/339,878, filed on Jul. 24, 2014, now Pat. No. 9,488,159.

(60) Provisional application No. 61/880,299, filed on Sep. 20, 2013.

(51) Int. Cl.
| | |
|---|---|
| *F03G 3/00* | (2006.01) |
| *B66F 1/00* | (2006.01) |
| *B66F 1/06* | (2006.01) |

(52) U.S. Cl.
CPC ............... *F03G 3/00* (2013.01); *B66F 1/00* (2013.01); *B66F 1/06* (2013.01)

(58) Field of Classification Search
CPC ............... F03G 3/00; B66F 1/00; B66F 1/06
See application file for complete search history.

(56) References Cited

U.S. PATENT DOCUMENTS

| | | | | |
|---|---|---|---|---|
| 2,498,422 A * | 2/1950 | Hermann | ............... | B66F 1/06 |
| | | | | 187/359 |
| 2,967,589 A * | 1/1961 | Forbes | ............... | B66F 1/02 |
| | | | | 187/222 |
| 9,488,159 B2 * | 11/2016 | Camp | ............... | B66F 1/00 |

* cited by examiner

*Primary Examiner* — Anna M Momper
*Assistant Examiner* — Lynn E Schwenning
(74) *Attorney, Agent, or Firm* — Pierson IP, PLLC

(57) ABSTRACT

Embodiments described herein may include at least one pole including a plurality of projections disposed at incremental heights along the pole, an object, a first pulley positioned on a first side of the object, and a second pulley positioned on the second side of the object.

17 Claims, 13 Drawing Sheets

LIFTING SYSTEM AND METHOD

CROSS-REFERENCE TO RELATED APPLICATIONS

This application claims a benefit of priority under 35 U.S.C. §119 to Provisional Application No. 61/880,299 filed on Sep. 20, 2013, and is a continuation of U.S. Ser. No. 14/339,878 filed on Jul. 24, 2014, which and fully incorporated herein by reference in its entirety.

BACKGROUND INFORMATION

Field of the Disclosure

Examples of the present disclosure are related to systems and methods that effectively and efficiently raise an object to a desired height. More specifically, as the object descends from a raised height, the object may provide energy that may be converted to an electric power by an electric generator.

Background

Potential energy is the energy of an object or a system due to the position of the object relative to a surface. Gravitational energy is the potential energy associated with gravitational force, where potential gravitational energy is obtained by elevating the object against Earth's gravity away from a surface of the earth. Factors that affect an object's potential gravitational energy include: the object's height respective to a reference point or Earth's surface, the object's weight, and the strength of the gravitation field it the object is in. Responsive to the object descending from a raised height towards the Earth's surface, gravity accelerates the mass of the object, and the potential energy is converted into kinetic energy. The kinetic energy may then be used to perform work or generate electricity by an electric generator.

In certain parts of the world, alternative energy sources such as gravity, solar, wind, and fossil fuels may be the only viable source of energy to individuals. However, the costs or creating solar or wind energy generators may be too high to construct. Similarly, purchasing fossil fuels may be too expensive. Further, solar energy is only available at night if power is stored in a battery, and wind power may only be available during certain parts of a day and/or year.

However, there is a need of cheap, reliable energy for electric lighting and other electronic devices that have no way to connect to an electrical power grid.

Accordingly, needs exist for systems and methods to generate electric power from gravity.

SUMMARY

Embodiments disclosed herein describe systems and methods for efficiently and effectively raising an object to create potential energy, and converting the potential energy into electric energy.

Embodiments may include at least one vertical pole, shaft, vertically extending structure (referred to hereinafter individually and collectively as "vertical pole"), wherein the vertical pole includes a plurality of projections or fulcrums (referred to hereinafter individually and collectively as "projections"). The plurality of projections may include sets of projections extending out of different sides of the vertical pole, and the sets of projections may be disposed at incremental heights along the vertical pole. In embodiments, a first set of projections may be positioned below a second set of projections along the vertical pole.

Embodiments may also include a carriage, an object supported within the carriage, a first pulley positioned on a first side of the carriage, and a second pulley positioned on the second side of the carriage. The carriage may be supported by a first set of projections, responsive to the first pulley applying force to the carriage, the carriage may tilt in a first direction, and a first pinion coupled to the carriage may interact with a second set of projections along the vertical pole. Next, the second pulley may apply force to the carriage, the carriage may be tilted in a second direction, and the pinion coupled to the carriage may interact with the second set of projections of the vertical pole to raise the carriage to the second set of projections. This process may be repeated until the carriage is at a desired height.

In embodiments, the amount of energy needed to tilt the carriage to be raised to the next set of projections may be based on the height of the carriage, the weight of the carriage, positioning of the first and second pinions, and the placement of the projections on the vertical pole.

Responsive to the object being tilted in a first direction, a first side of the carriage may be raised to a height determined by the distance between the lower and upper projections and the physical height of the object. Responsive to the pinions of the carriage being positioned on different sets of projections that are positioned at different heights on the vertical pole, the center of mass of the carriage and the object supported and contained within the carriage may be shifted, such that the object may assist in raising the carriage to the next set of projections. A maximum force to tilt is realized when the pinions are moved to the maximum width of the object and decreased as the pinions are moved to the center of the objects width. The placement of the pinions establishes two fulcrum positions along the base of the carriage and determines tilting support points of the carriage.

In embodiments, if the height of the object is increased and/or the width of the object is decreased, or the spacing between the pinions are decreased, the distance the carriage is able to be raised may decrease, while also decreasing the amount of energy needed to tilt the object. In embodiments, based on the shape and/or size of the object and the placement of the pinions, different distances between the sets of projections may be desired or required. The placement of the pinions determines the height that the base of the carriage will be vertically lifted when tilted and the maximum angle of tilt before the object will tilt over under the influence of gravity.

In embodiments, once the carriage is at a desired height, the carriage may be lowered and the potential energy that the object possesses may be transferred to an electric energy converter and converted into electrical energy. To this end, embodiments may be configured to allow a single individual or a plurality of individuals to efficiently raise a heavy carriage to a height to produce enough potential energy that may be converted to electrical energy.

In embodiments, to increase the amount of potential energy that may be obtained from the raised object, the height of the vertical pole may be increased, the weight of the object may be increased, and/or the number of lifting systems may be increased. Therefore, individuals may be able to generate sustainable electrical energy using embodiments that are configured to raise an object by changing the center of mass of the object, such that the object aids in lifting itself up.

In embodiments, the placement of the projections may determine the vertical distance that the carriage may move vertically when the object is tilted. More projections may be placed on the vertical pole than needed so as to take into account a partial tilt, thus providing a holding place for the pinions. Projection spacing along the vertical pole are determined by the design of the carriage and the location of the two fulcrum positions along the base of the carriage, which determines the maximum tilt angle of the carriage.

In embodiments, a plurality of vertical poles may be coupled together by coupling a drive shaft from a first gear box of a first vertical pole to a second gear box of a second vertical pole. By raising a first carriage associated with the first vertical pole and a second carriage associated with the second vertical pole the total potential energy of the first and second objects may be converted into kinetic energy. Therefore, the first and second gear boxes may be configured to increase the amount of converted electrical energy generated by a plurality of vertical poles.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
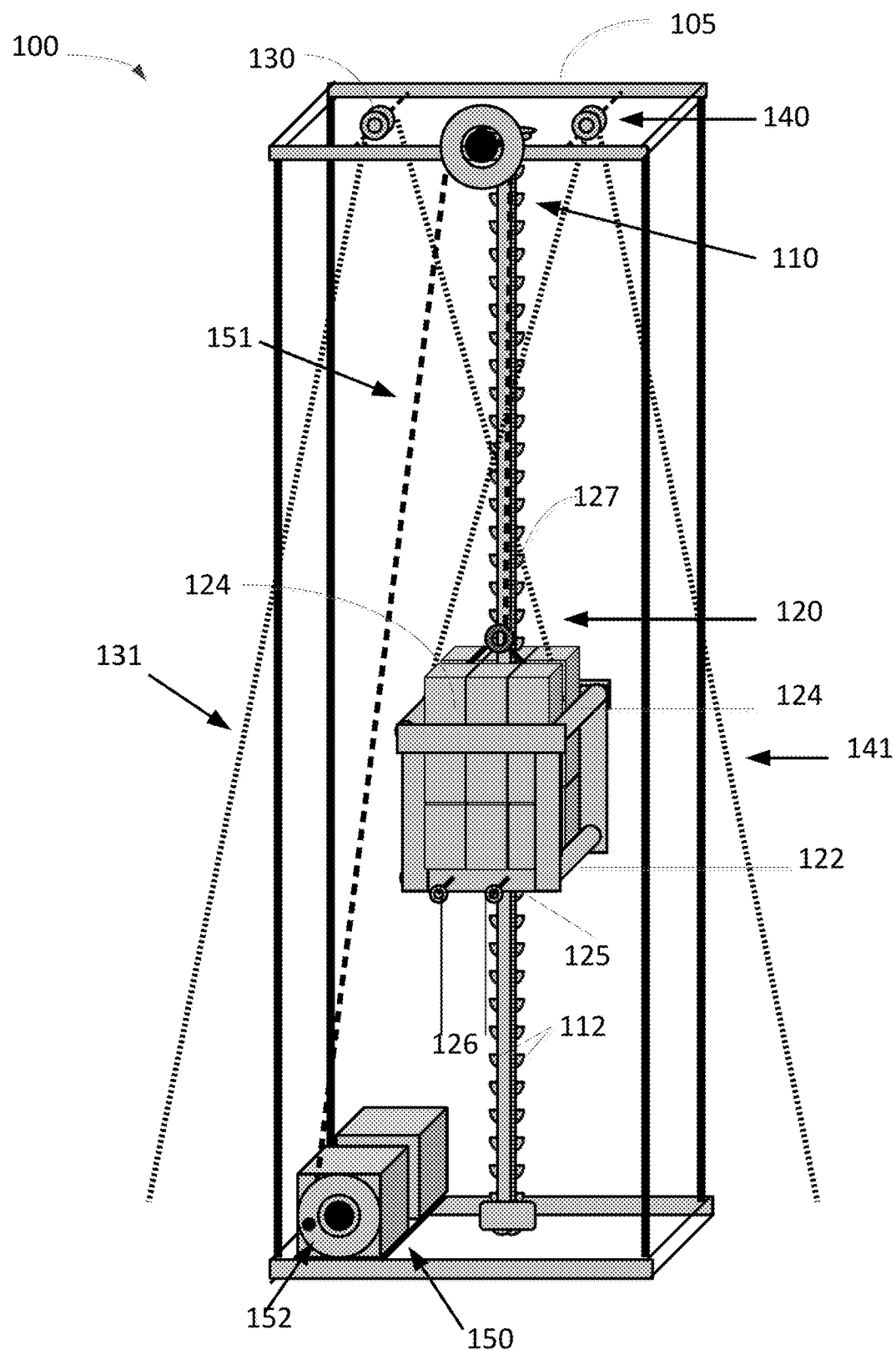
FIG. 1 depicts one embodiment of a lifting system.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

In the following description, numerous specific details are set forth in order to provide a thorough understanding of the present embodiments. It will be apparent, however, to one having ordinary skill in the art that the specific detail need not be employed to practice the present embodiments. In other instances, well-known materials or methods have not been described in detail in order to avoid obscuring the present embodiments.

Additionally, any examples or illustrations given herein are not to be regarded in any way as restrictions on, limits to, or express definitions of any term or terms with which they are utilized. Instead, these examples or illustrations are to be regarded as being described with respect to one particular embodiment and as being illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," and "in one embodiment."

The non-limiting embodiments described below are configured to efficiently and effectively raise an object to create potential energy, control the decent of the object creating kinetic energy, and convert the kinetic energy into electrical energy. Embodiments may be configured to be utilized at any desired period of the day, which may provide sustainable and readily available electrical energy.

FIG. 1 depicts a lifting system 100 including a frame 105, vertical pole 110, carriage 120, first pulley system 130, second pulley system 140, and electric generator 150.

Frame 105 may be a structural support system that may be configured to support components of lifting system 100. Frame 105 may have a base that may be positioned adjacent to a surface of the ground. Frame 105 may extend vertically away from the surface of the ground to at least a top surface of vertical pole 110. The top surface of frame 105 may include a first wheel guide for first pulley system 130, a second wheel guide for second pulley system 140, and/or a third wheel guide for electric generator 150. The wheel guides may be configured to guide cords, cables, etc. coupled to object 120.

Vertical pole 110 may be an object of any shape or size that has a length greater than its diameter. Vertical pole 110 may have a lower surface positioned within a surface of the ground or adjacent to a surface of the ground, and vertical pole 110 may extend vertically away from the surface of the ground towards the upper surface of frame 105.

Vertical pole 110 may include a plurality of projections 112. Projections 112 may be fulcrums, pivots, points, etc. that are configured to allow carriage 120 to be tilted in a first direction and tilted in a second direction. In embodiments, projections 112 may be vertically spaced at repetitive intervals throughout vertical pole 110. Projections 122 may have a substantially flat upper surface, and may have an edge that is downwardly curved or downwardly angled between an outermost edge of the top surface of projection 112 and vertical pole 110.

The spacing between a first set of projections 112 and a second set of projections 112 may be determined by empirical evidence based on the height and width of carriage 120 and the distance between the contact point of pinions 125 with the projections 112 on the vertical pole 110. carriage Further, the distance between the first set of projections 112 and the second set of projections 112 may be based on the angle of tilt determined by the vertical distance the base of carriage 120 is raised from a horizontal position at the point where the pinions 125 touch the projections 112 along the vertical pole 110. The point where pinions 125 make contact and is supported by projections 112 on the vertical pole 110 determines the two fulcrum points along the base of carriage 120. These two fulcrum points are used in the calculation of the angle of tilt and the force required to tilt. The amount of force required to tilt carriage 120 from the first set of projections 112 to the second set of projections 112 is determined by the height of carriage 120 and the weight it carries as well as the width of carriage 120 and the placement of the pinions 125.

Carriage 120 may hold any desired item, that has enough weight to create a potential energy when raised, have vertical pole 110 extend through an orifice on the lower surface of carriage 120, and be tilted in a first direction and a second direction. Carriage 120 may include block modules 123, pulley system receivers 124, pinions 125, and pinion movement restrictors 126.

Carriage 122 may be a box, container, or any other type of receptacle that is configured to receive block modules 123 or any other type of item. In embodiments, carriage 122 may have an open top surface, where items may be disposed within the body of carriage. Carriage 122 may have a bottom surface with an opening, where vertical pole 110 may extend through. The opening on the bottom surface of carriage 122 may be configured to allow object 120 to be tilted in a first direction and a second direction.

Block modules 123 may be items with substantially the same shape, size, and weight. However one skilled in the art will appreciate that block modules 123 may have different shapes, sizes, and weights. Block modules 123 may be configured to be positioned within a body of carriage 122 to increase the weight of carriage 122, and thus the potential energy of carriage 122 when carriage 122 is raised. In embodiments, block modules 123 may have a length that is substantially the same as the length of carriage 122. Block modules 123 may have a depth that is smaller than half of the depth of carriage 122. Accordingly, a first block module 123 may be positioned adjacent to a first side of vertical pole 110 and a second block module 123 may be positioned adjacent to a second side of vertical pole 110. Therefore, while block modules 123 are positioned within carriage 122, vertical pole 110 may traverse carriage 122, and carriage 122 may be tilted in a first direction and a second direction because block modules 123 may be positioned to not impede the tilting of carriage 122.

Each side of carriage 122 may include pulley system receivers 124. Responsive to a first cable 131 of first pulley system 130 being pulled to lift carriage 122, the resultant force applied to a first pulley system receiver 124 may raise a first side of carriage 122. Responsive to a second cable 141 second pulley system 140 being pulled to lift carriage 122, the resultant force applied to a second pulley system receiver 124 may raise a second side of carriage 122. Therefore, carriage 122 may be raised to a first set of projections 112 by tilting carriage 122 in a first direction, which may change the center of mass of carriage 122. Carriage 122 may then be tilted in a second direction, and the change in the center of mass of carriage 122 may be configured to assist in lifting carriage 122 to the first set of projections 112.

In embodiments, carriage 122 may also include a drop cable lift ring 127. Drop cable lift ring 127 may be configured to be coupled to electric generator 150 via a drop cable 151. As carriage 122 descends, the drop cable may cause torque to electric generator 150 to convert to kinetic energy of the descending carriage to electric power.

Pinions 125 may be positioned on an underside of the carriage 122. Pinions 125 may be any hinged plate, which may be a one way hinge, wherein the one way hinge may be configured to only open in a single direction. In embodiments, pinions 125 may be configured to support carriage 122 if pinions 125 are positioned on upper surfaces of projections 112, and pinions 125 may be configured to rotate in a downward manner while carriage 122 is being tilted. Responsive to carriage 122 being tilted, pinion 125 may supply sufficient force to projection 112 such that pinion 125 may be positioned on the upper surface of projection 112. In embodiments, a first pinion 125 may be positioned on a first side of carriage 122 and extend towards a center of carriage 122, and a second pinion 125 may be positioned on a second side of carriage and extend towards the center of carriage 122. In embodiments, carriage 122 is tilted in a first direction, the first pinion 125 may interface with projection 112. Responsive to first pinion 125 interfacing within projection 112, first pinion 125 may rotate in a downward manner under projection 112. Once carriage 122 is fully tilted, first pinion 125 may be positioned on top of projection 112.

Pinion movement restrictors 126 may be devices configured to restrict the movement of pinion 125 so as to support the carriage in place on projections 112. In embodiments, if the pinion movement restrictors 126 are set in their restrictive position, the carriage 122, may not descend vertical pole 110. Once the pinion movement restrictors 126 are unset, carriage 122 may descend vertical pole 110.

First pulley system 130 may be a pulley system with a wheel on an axle that is configured to support movement and/or tilting of carriage in a first direction. A first end of first pulley system 130 may be configured to receive force on a rocking cord. Responsive to the rocking cord receiving force, a second side first pulley system that is coupled to a second side of carriage 122 may be configured to elevate or tilt carriage 122 in a first direction.

Second pulley system 140 may be a pulley system with a wheel on an axle that is configured to support movement and/or tilting of carriage in a second direction. A first end of second pulley system 140 may be configured to receive force on a rocking cord. Responsive to the rocking cord receiving force, a second side first pulley system that is coupled to a first side of carriage 122 may be configure to elevate or tilt carriage 122 in a second direction.

Electric generator 150 is a hardware device that is configured to convert mechanical energy, such as the kinetic energy caused by object 120 descending, into electrical energy. In embodiments, responsive to object 120 descending, the drop cable 151 is wound around take up reel 152 which unwinds and turns the shaft of generator 150, supplying torque to the electric generator 150. The torque created by descending carriage 120 may be utilized by electric generator 150 to convert the mechanical energy into electrical energy.

Figure 2:
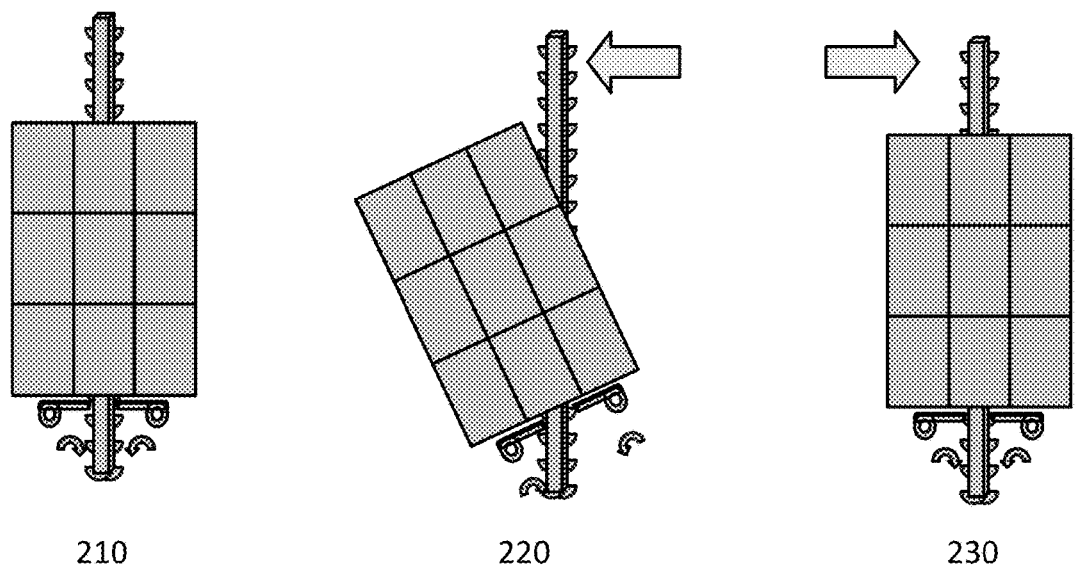
FIG. 2 depicts one embodiment of a method for lifting an object.

FIG. 2 depicts a method 200 for lifting an object. The operations of method 200 presented below are intended to be illustrative. In some embodiments, method 200 may be accomplished with one or more additional operations not described, and/or without one or more of the operations discussed. Additionally, the order in which the operations of method 200 are illustrated in FIG. 2 and described below is not intended to be limiting.

At operation 210, the pinions on both sides of a carriage may be supporting the weight of the carriage on a first set of projections. Further, the carriage may be substantially level, and positioned on an upper surface of the first set of projections on a vertical pole. As depicted at operation 210, a substantially similar amount of the block module may be positioned on a first side of the vertical pole as the amount of the block module positioned on a second side of the vertical pole. Operation 210 may be performed by a lifting system is the same as or similar to lifting system 100, in accordance with one or more implementations.

At operation 220, force may be applied to a first side of carriage to tilt the carriage in a first direction. Responsive to the force being applied to the first side of carriage, a first pinion may be positioned above a second set of projections, and a second pinion may be positioned above the first set of projections. In embodiments, once an initial amount of force is applied to the carriage to tilt the carriage, the center of mass of the carriage may be changed, and the weight of the carriage may be utilized to position the first pinion above the second set of projections. Therefore, in addition to the force applied to tilt the carriage, the physical dimensions of the object may be utilized to lift the carriage. Operation 220 may be performed by a lifting system the same as or similar to lifting system 100, in accordance with one or more implementations.

At operation 230, force may be applied to a second side of the carriage to tilt the carriage in a second direction. Responsive to the force being applied to the second side of the carriage, the second pinion may be positioned above the second set of projections, and the second pinion may be positioned above the second set of projections. In embodiments, once an initial amount of force is applied to the carriage to tilt the carriage in the second direction, the weight of the carriage may pivot around the second set of projections on the first side of the carriage, and the weight of the carriage may be utilized to position the second pinion above the second set of projections. Therefore, in addition to the force applied to tilt the carriage, the weight of the carriage pivoting around the second set of projections may be utilized to lift the carriage. Operation 230 may be performed by a lifting system that is the same as or similar to lifting system 100, in accordance with one or more implementations.

One skilled in the art may appreciate that operations 220 and 230 may be repeated to raise the carriage to different heights on vertical pole to increase the potential energy of the carriage. Furthermore, one skilled in the art may appreciate that the direction of the force desired to tilt the carriage in operations 220 and 230 may be reversed.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

Figure 3:
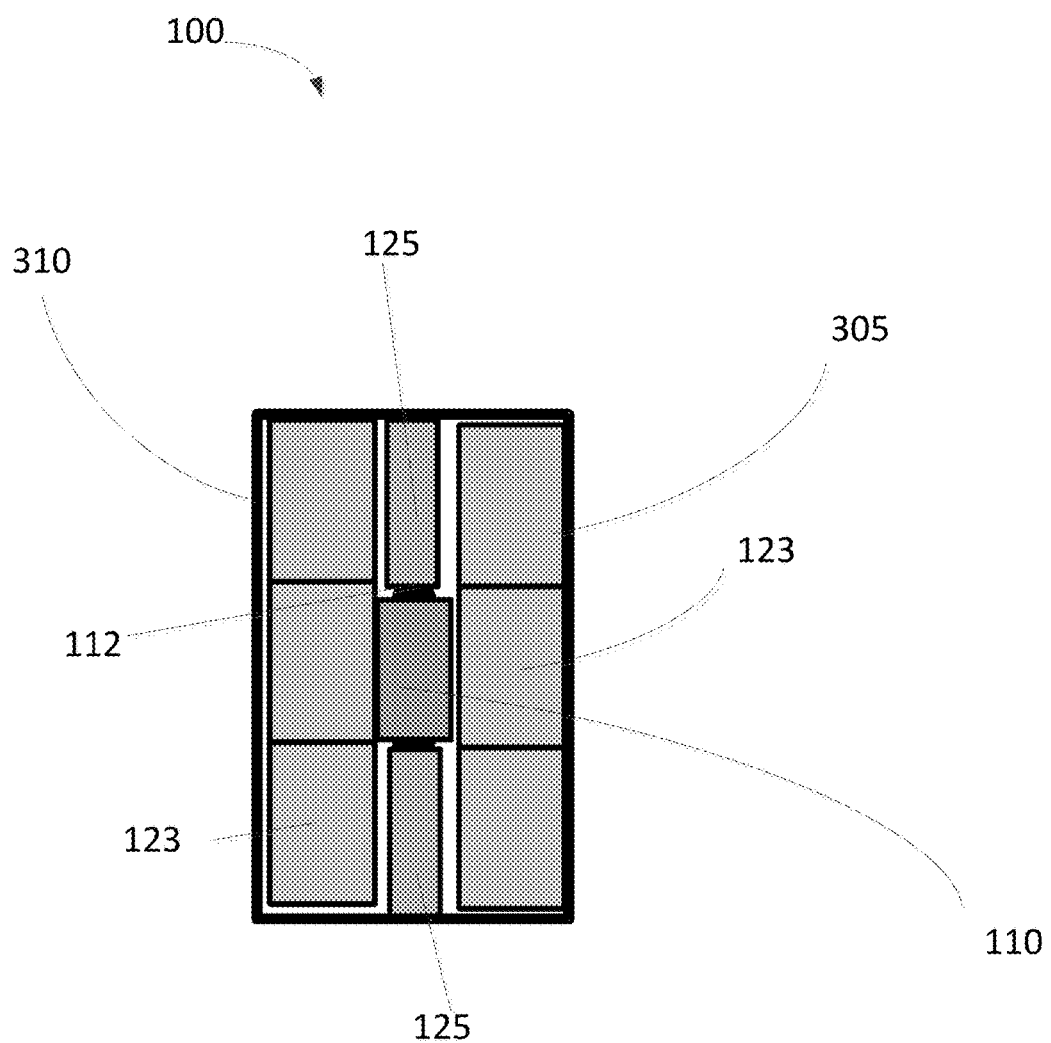
FIG. 3 depicts one embodiment of a top view of a lifting system.

FIG. 3 depicts a top view of lifting system 100. Elements depicted in FIG. 3 may be the same as those depicted in FIG. 1, and for the sake of brevity an additional description of those elements is omitted.

As depicted in FIG. 3, a first set of block modules 123 is positioned on a first side 305 of carriage 122, and a second set of block modules 123 is positioned on a second side 310 of carriage 122. Vertical pole 110 may be positioned at the center of carriage 122, and carriage 120 may be positioned above a first set of projections 112. In embodiments, pinions 125 may be positioned adjacent to and over the first set of projections. Elements depicted in FIG. 3 may be the same as those depicted in FIG. 1.

Figure 4:
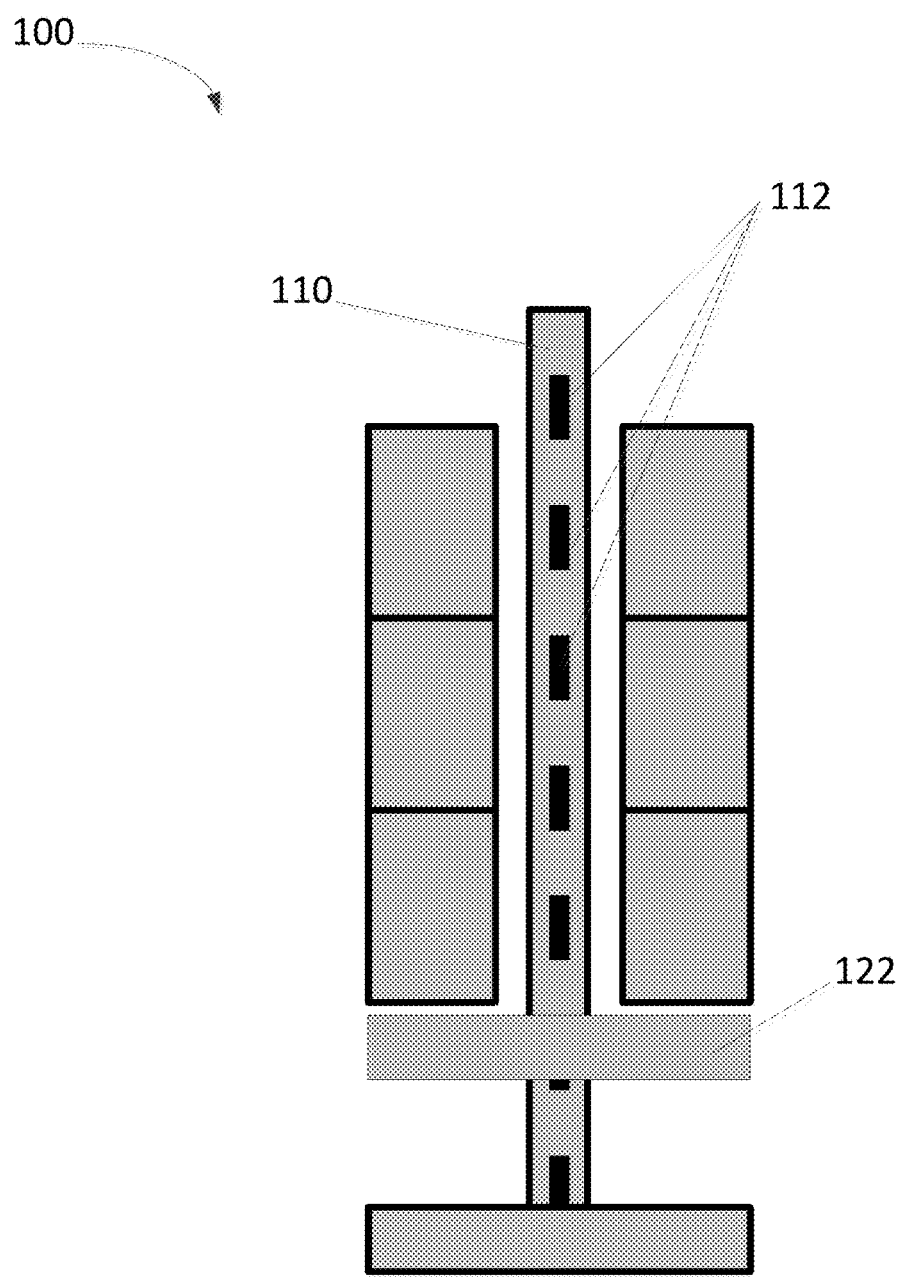
FIG. 4 depicts one embodiment a side view of a lifting system.

FIG. 4 depicts a side view of lifting system 100. Elements depicted in FIG. 4 may be the same as those depicted in FIGS. 1 and 3, and for the sake of brevity an additional description of those elements is omitted.

As depicted in FIG. 4, a plurality of projections 112 may be positioned at even intervals along vertical pole 110. As carriage 122 is tilted in the first direction and then the second direction, carriage 122 may be positioned at a higher set of projections 112.

Figure 5:
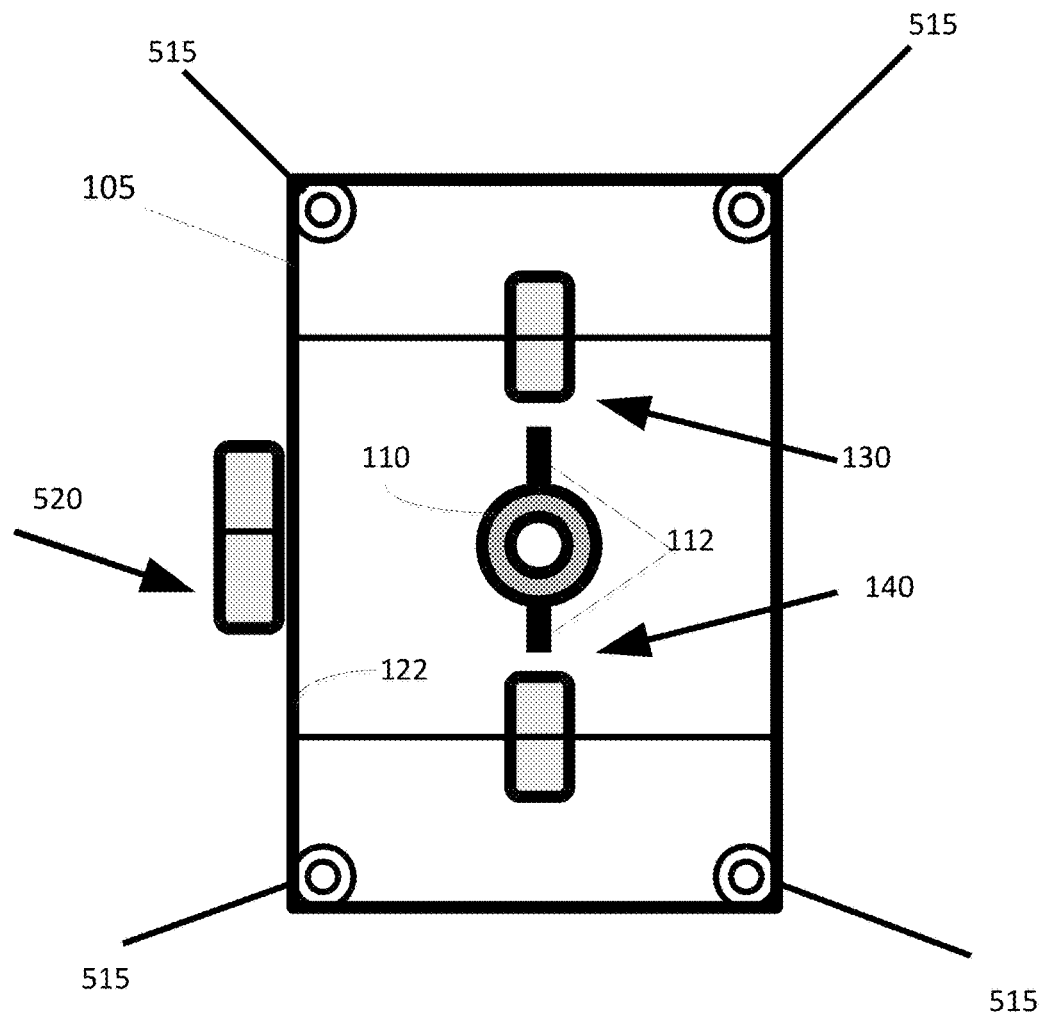
FIG. 5 depicts one embodiment of a top view of a lifting system.

FIG. 5 depicts a top view of lifting system 100. Elements depicted in FIG. 5 may be the same as those depicted in FIGS. 1, 3 and 4, and for the sake of brevity an additional description of those elements is omitted.

As depicted in FIG. 5, first pulley system 130 may be positioned on a first side of frame 105, and second pulley system 140 may be positioned on a second side of frame 105. First and second pulley systems 130, 140 may include a rocking cord guide wheels that are configured to guide the cords, cables wires, etc. of first and second pulley systems 130, 140 when the cords are pulled. Frame 105 includes drop cable guide wheel 520 that is configured to guide a cable coupled to electric generator 150 and carriage 122, such that as carriage 122 descends the coupled cable can be guided.

Furthermore, frame 105 may include a plurality of wire tie offs 515, where cords, cables, wires, etc. may be used to anchor the system 100 to ground anchor points so as to stabilize system 100 when raising a carriage 122 up vertical pole 110.

Figure 6:
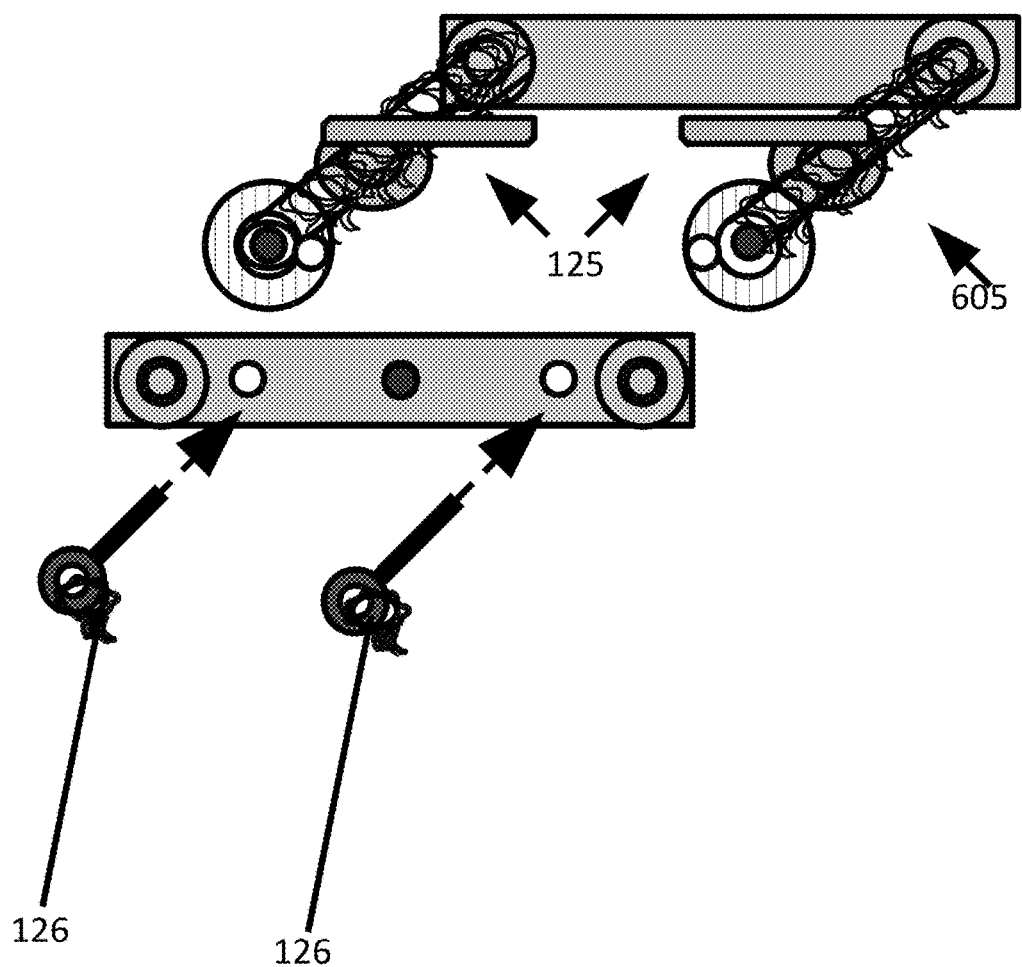
FIG. 6 depicts one embodiment of a perspective view of a carriage.

FIG. 6 depicts a perspective view of carriage 122. Elements depicted in FIG. 6 may be the same as those depicted in FIGS. 1, and 3-5, and for the sake of brevity an additional description of those elements is omitted.

Pinions 125 may include tension springs 605 that are configured to operate with a load, such that the tension springs 605 stretches as a load is applied to a lower surface of a respective pinion 125. Responsive to the tension spring 605 stretching, pinion 125 may lock into place to support carriage 122 on a projection 112. If a load is applied to the upper surface of a respective pinion 125, the respective tension spring 605 may contract allowing the respective pinion 125 to rotate.

Figure 7A:
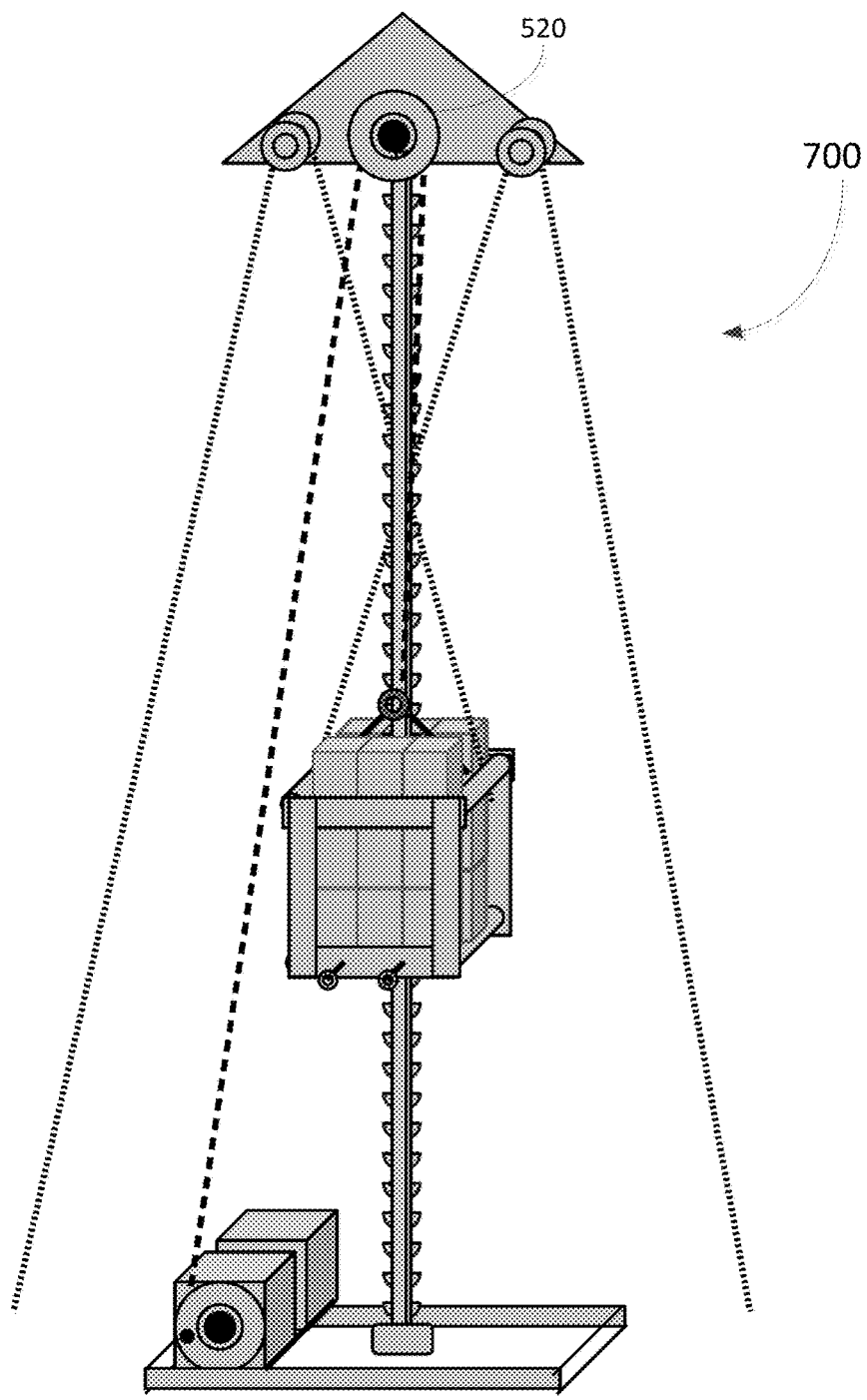
FIGS. 7A and 7B depict different embodiments of a lifting system.
Figure 7B:
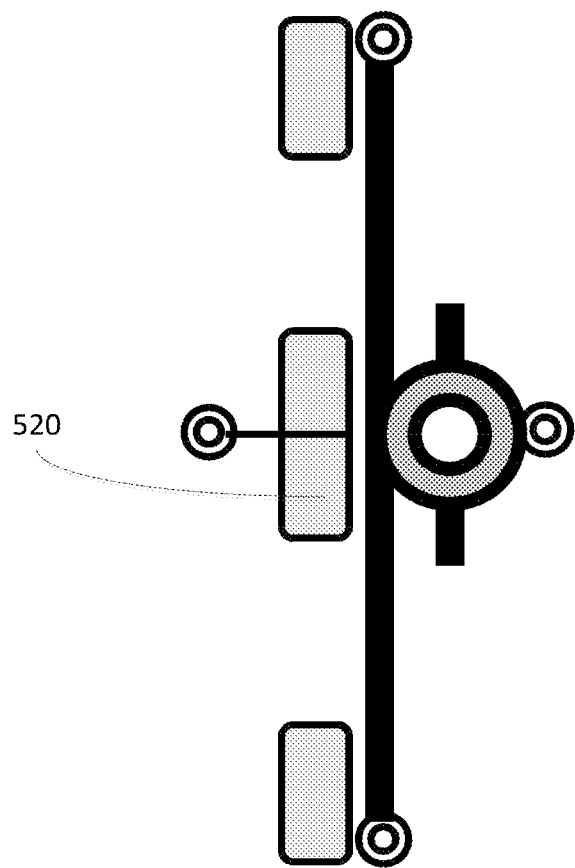

FIGS. 7A and 7B depict different embodiments of a lifting system 700. The elements in lifting system 700 may be substantially the same as those describe in lifting system 100, and for the sake of brevity an additional description of these elements is omitted.

As can be appreciated by lifting system 700, the rocking cords, drop cable guide wheels, and guide wire tie offs may be placed in different positions within the frame of lifting system 700. Therefore, different mechanical configurations may be obtained to enhance ease of operation.

Figure 8:
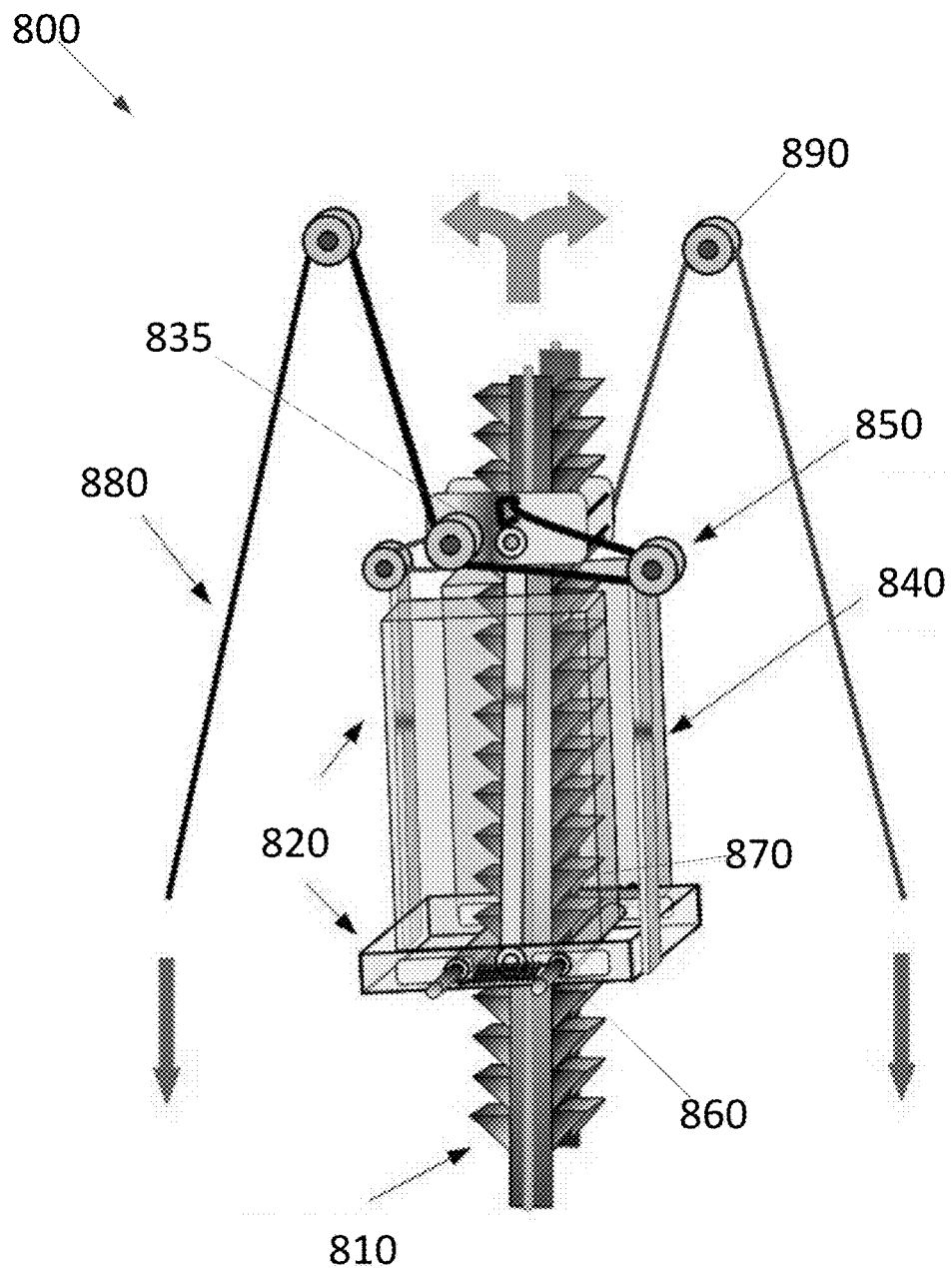
FIG. 8 depicts one embodiment of a lifting system.

FIG. 8 depicts one embodiment of lifting system 800. Lifting system 800 may include a single vertical pole 810, wherein the vertical pole 810 is configured to support the carriage 820.

Carriage 820 may include two lift enhancers lever assist arms 840, and pulley 850. The lift enhances may be configured to extend the height of the carriage 820, which may increase the mechanical advantage of lifting system 800. As carriage 820 is tilted from one side to the other the pinion 860 on either side of the vertical pole 810 moves from one support position to the next support position. Springs act on to the pinions 860, keeping the pinion 860 pressed against vertical pole 810, wherein the springs allow pinions 860 to keep constant contact to supports 870 as carriage 820 tilts. The supports 870 on either side of the vertical pole may be positioned at intervals and sized based on the size and weight of carriage 820 being tilted and the angle of tilt.

The cable assist lines 880 may be threaded through an upper support and guide assembly at the top of the vertical support (not shown). Cable assist lines 880 may in turn be threaded through pulleys 890, and pulleys 850 coupled with the pulley support assembly 835, and lever assist arms 840. The pulley support assembly 835 may be configured to slide up and down the vertical pole 110 as the carriage 820 moves vertically up or down. The pulley support assembly 835 attaches to the bottom center of the carriage 820. Pulley 850 may be coupled to carriage 820, allowing carriage 820 to move freely. In embodiments, pulley support assembly 835 may be configured to remain level while carriage 820 tilts.

Figure 9:
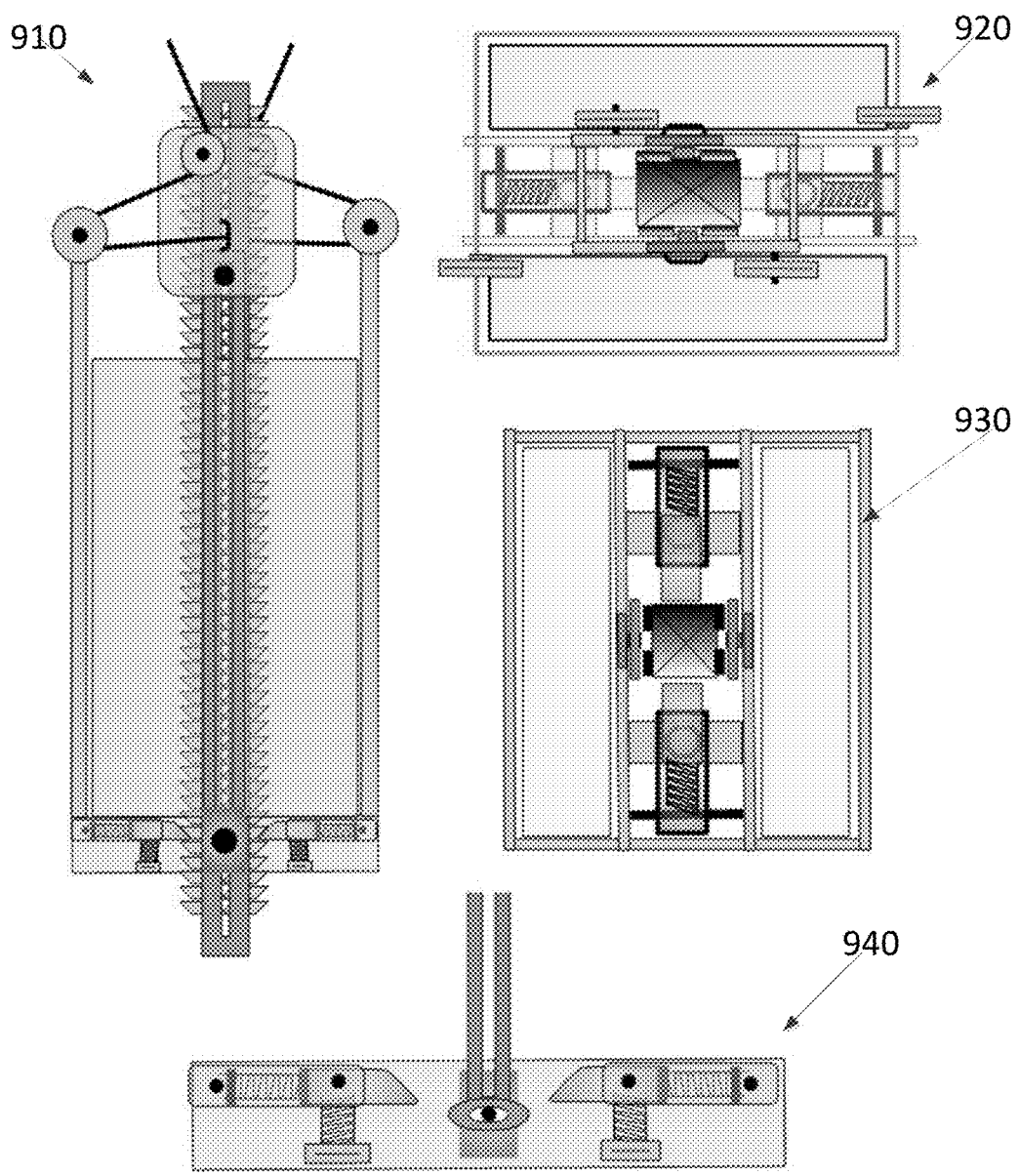
FIG. 9 depicts different views of one embodiment of a lifting system.

FIG. 9 depicts different views of lifting system 800. The views depicted in FIG. 9 include front view 910, top view 920, bottom view 930, and side view 940. FIG. 9 depicts a modified pinion configuration which further enhances the design presented in FIG. 6.

Figure 10:
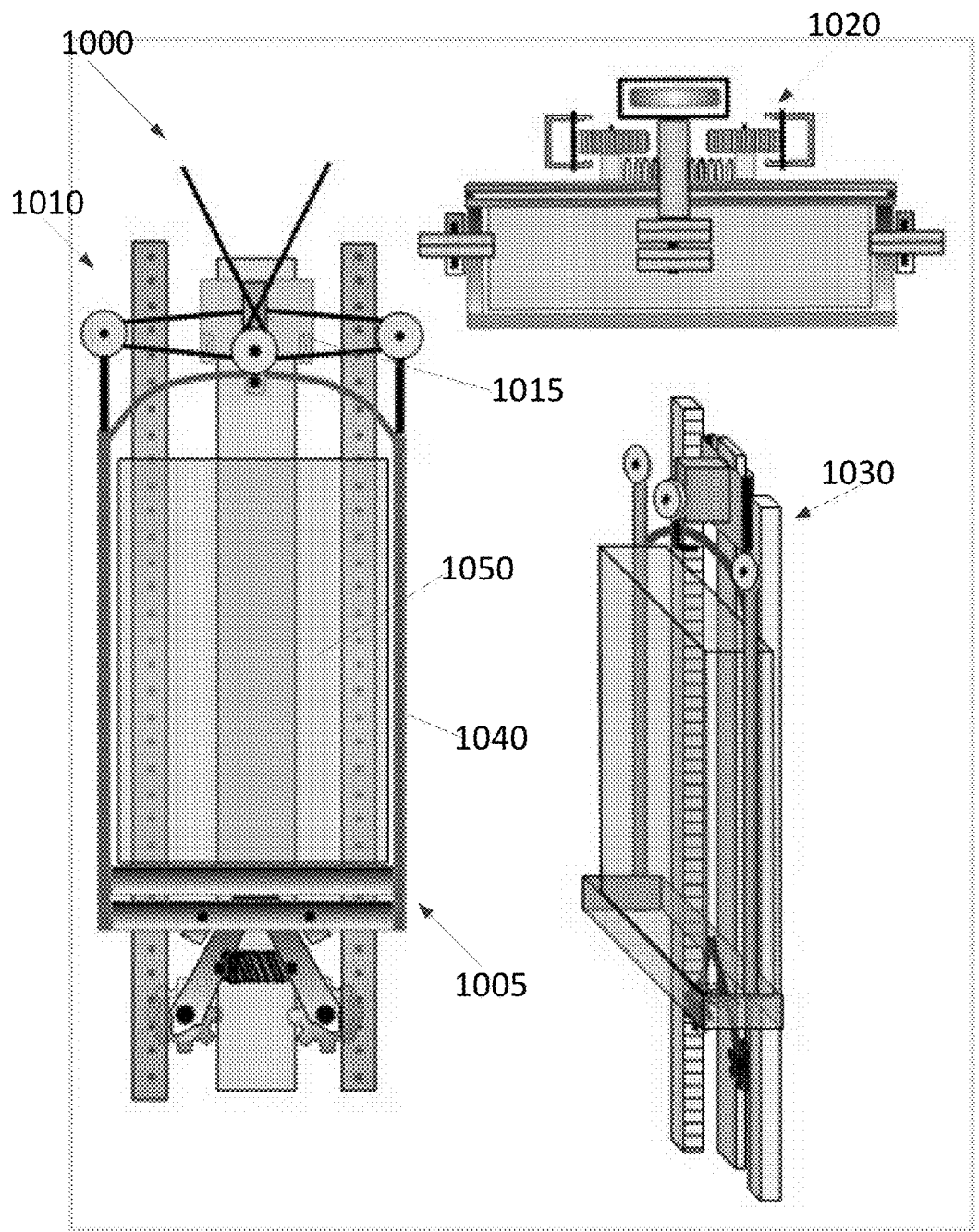
FIG. 10 depicts different views of one embodiment of a lifting system.

FIG. 10 depicts different views of lifting system 1000. The views depicted in FIG. 10 include front view 1010, top view 1020, and perspective view 1030. Lifting system 1000 may be a multi-pole lifter including a single carriage 1040 and a single block 1050. However, as with other embodiments lifting system 1000 may be configured to include a plurality of blocks with one on each side of the two vertical support poles. In other embodiments, lifting system 1000 may be configured with four vertical support poles arranged with one or more blocks between them or on either side or between them. Lifting system 1000 depicts an embodiment with two vertical support racks with support points built into it. A carriage assembly includes two ratchet support arms with ratchet pinions attached. The ratchet pinions may be configured to roll up the inside of the vertical support rack and engages the support points.

In embodiments, the ratchet pinions may be configured to roll in only one direction while the carriage assembly is tilted back and forth. Once the block is to the height desired, the ratchet pinions direction of rotation is set in reverse so as to allow the carriage 1005 to slide back down the vertical support rack. At the top of the carriage is a pulley support assembly 1015. The pulley support assembly 1015 slides up and down the vertical pole 110 as the carriage 1005 moves vertically up or down. The pulley support assembly 1015 attaches to the bottom center of the carriage 1005 and provides for placement of additional pulleys and stability of carriage 1005

Figure 11:
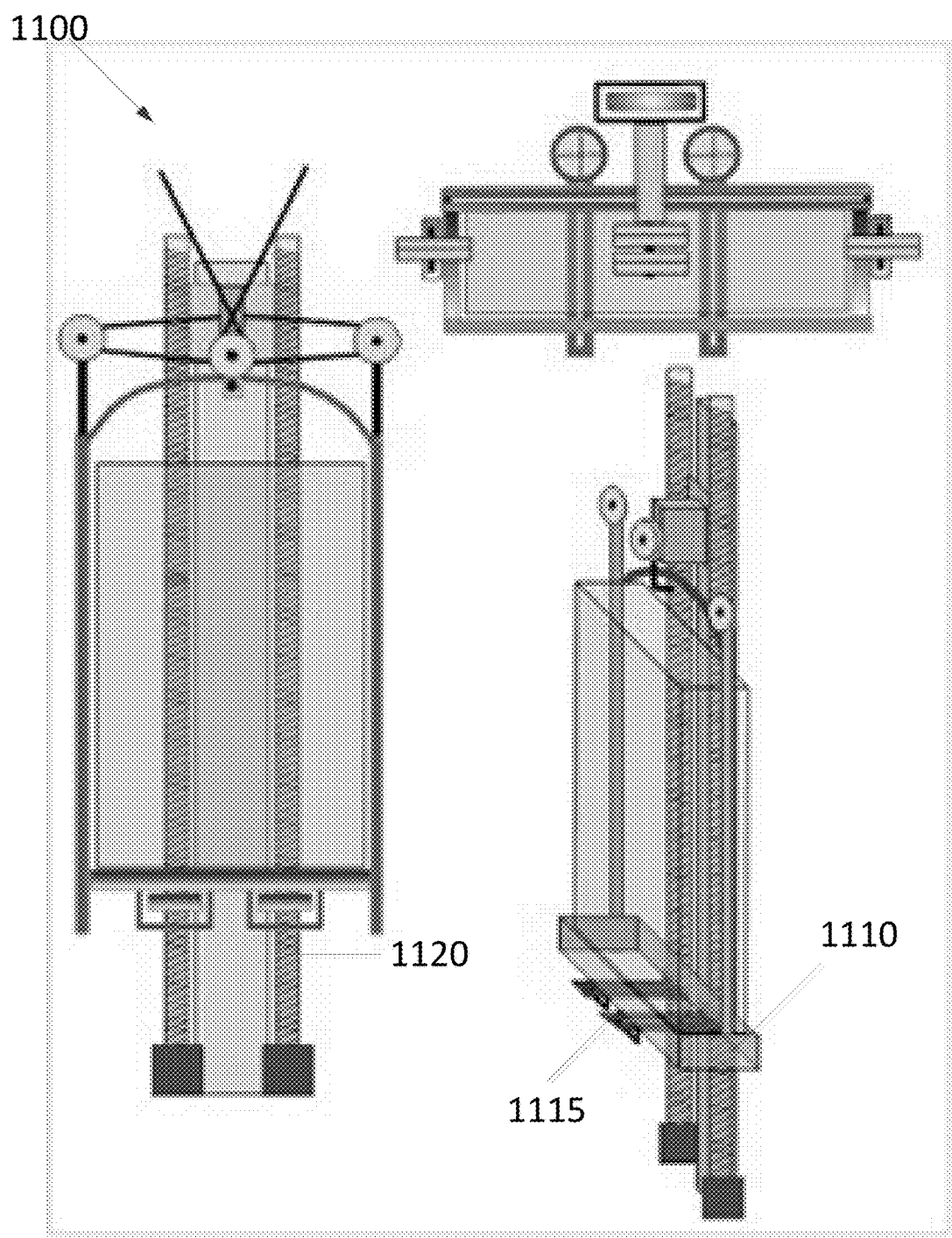
FIG. 11 depicts different views of one embodiment of a lifting system.

FIG. 11 depicts different views of one embodiment of lifting system 1100. Lifting system 1110 may be an implementation promoting the basic, tilt and position action necessary for a lifter to operate.

The carriage 1110 is held at its two fulcrum points by supporting arms 1115 which are in turn supported by two vertical support screws 1120. The support arms 1115 are moved up and down by the turning action of the vertical support screws 1120. The vertical supports are acted upon by the mechanics at the top of the lifter. Similar to other embodiments, the tilting mechanism moves back and forth causing the carriage 1110 to tilt through a tilt cycle. As the carriage 1110 is tilted to one side the vertical support screw 1120 opposite the direction of tilt turns and raises the supporting arm up to meet the bottom of the tilted carriage 1110. Upon reversing the carriage 1110 tilt direction, the process is repeated, allowing the other support arm to move up to the bottom of the Carriage.

This implementation may increase stability due to being supported by two arms 1115 extended from the vertical support screws 1120. Furthermore, the gears needed to turn the vertical support screws 1120 and the tilting mechanisms are easily operated from a central rotating shaft, which is ideal for a wind powered source. This allows for gearing up or down the force transferred, easily matching the tilting and turning power requirements of lifting system 1100. Like other lifting systems, a method must be incorporated to release the ratchet gears on the tilting arms and the vertical support screws 1120 from the vertical support arms 1115 so as to allow the carriage 1110 to descend.

Figure 12:
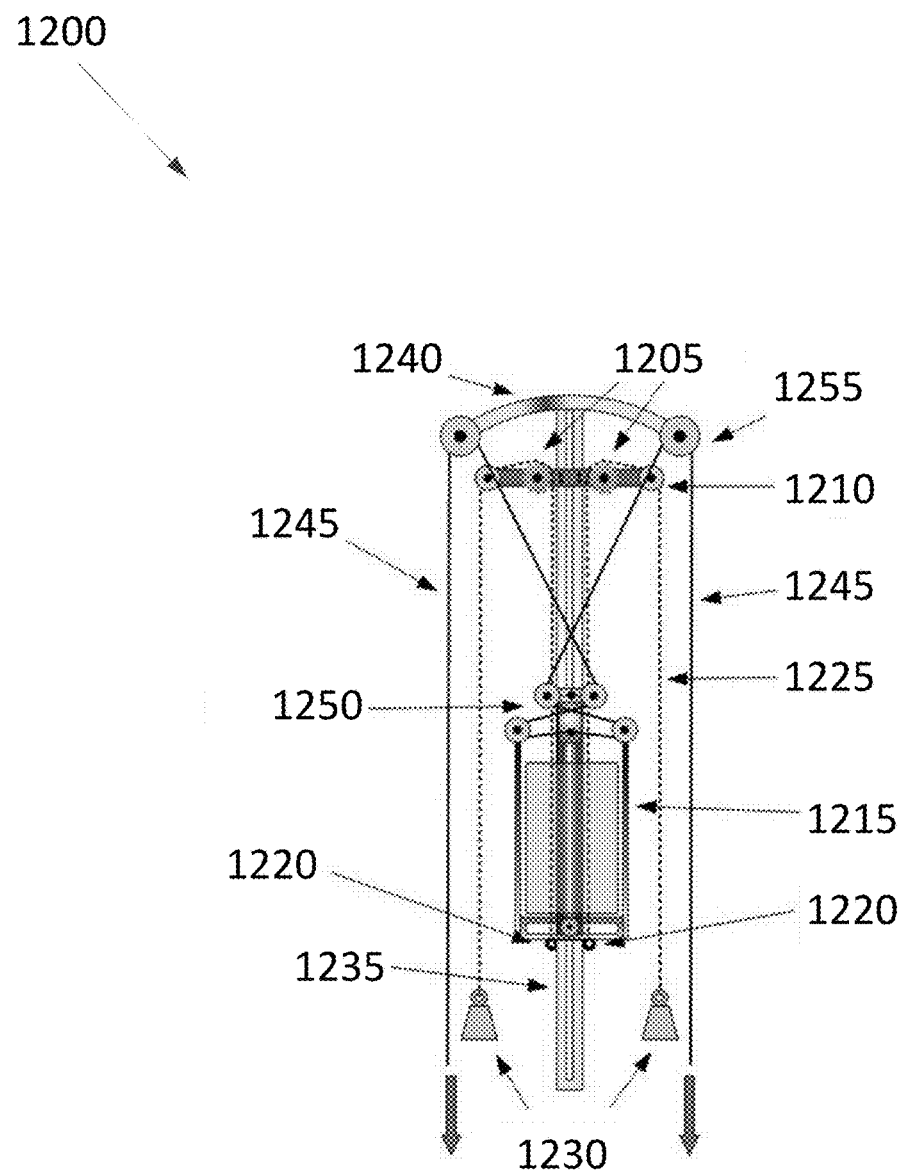
FIG. 12 depicts different views of one embodiment of a lifting system.

FIG. 12 depicts one embodiment of lifting system 1200. Lifting system 1200 may not include a vertical pole support with fulcrum support points built into it.

Lifting system 1200 may be a single pole lifter 1235, which may incorporate elements of other embodiments. However, lifting system 1200 may include a pulley system 1250, with a rocking cable pulley guide 1255, a ratchet pinion 1205 coupled to a fulcrum support bar 1210. On the fulcrum support bar 1210 the ratchet pinion may be a ratchet gear that guides a cable/chain down to the carriage assembly 1215 to the fulcrum cable attachment location 1220. Each time the carriage assembly 1215 is tilted one of the fulcrum cables 1225 is pulled up tight by a counter weight 1230. The ratchet gear 1205 keeps the cable/chain 1225 from moving backward and a new fulcrum position is acquired. Successive tilting back and forth will result in the carriage assembly 1225 rising up the vertical support pole 1235.

A lifter upper cross bar 1240 is shown in this embodiment with rocking cables 1245, used for ground based input, but could be replaced with a rocking assembly which might be attached to some mechanical assembly using some other power source. In embodiments, the weight and carriage 1220 may be allowed to drop back down the vertical support pole 1235 to obtain the potential energy of the raised object.

Reference throughout this specification to "one embodiment," "an embodiment" "one example," or "an example" means that a particular feature, structure or characteristic described in connection with the embodiment or example is included in at least one embodiment of the present embodiments. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

The flowchart and block diagrams in the flow diagrams illustrate the architecture, functionality, and operation of possible implementations of systems, methods, and computer program products according to various embodiments of the present embodiments. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware.

As used herein, the terms "comprises," "comprising," "includes," "including," "has," "having," or any other variation thereof, are intended to cover a non-exclusive inclusion. For example, a process, article, or apparatus that comprises a list of elements is not necessarily limited to only those elements but may include other elements not expressly listed or inherent to such process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

What is claimed is:

1. A lifting system comprising:
a structural support with a plurality of sets of projections;
a carriage configured to receive and store a plurality of items to be lifted;
a tilting system configured to interface with the carriage to tilt the carriage in a first direction and a second direction, wherein the carriage is lifted responsive to tilting the carriage with respect to the tilting system to change a center of mass of the carriage;
a first fulcrum positioned on a first side of the carriage, wherein the first fulcrum is configured to support the carriage when the carriage is tilted in the first direction;
a second fulcrum positioned on a second side of the carriage, wherein the second fulcrum is configured to support the carriage when the carriage is tilted in the second direction;
wherein the first fulcrum and the second fulcrum are positioned on a base of the carriage; and
wherein each set of projections has a first projection configured to interface with the first fulcrum and a second projection configured to interface with the second fulcrum.

2. The system of claim 1, wherein the structural support is a shaft extending through the carriage.

3. The system of claim 1, wherein the first fulcrum and the second fulcrum are configured to be positioned over the first projection and the second projection.

4. The lifting system of claim 1, wherein the center of mass of the carriage is configured to change responsive to tilting the carriage in the first direction or the second direction.

5. The system of claim 1, wherein the plurality of items are the same shape, size, and weight.

6. The system of claim 1, wherein responsive to tilting the carriage in the first direction the first fulcrum is positioned at a different vertical height than the second fulcrum.

7. A lifting system comprising:
a structural support with a plurality of sets of projections;
a carriage configured to receive and store a plurality of items to be lifted;
a tilting system configured to interface with the carriage to tilt the carriage in a first direction and a second direction, wherein the carriage is lifted responsive to tilting the carriage with respect to the tilting system to change a center of mass of the carriage;
a first fulcrum positioned on a first side of the carriage, wherein the first fulcrum is configured to support the carriage when the carriage is tilted in the first direction;
a second fulcrum positioned on a second side of the carriage, wherein the second fulcrum is configured to support the carriage when the carriage is tilted in the second direction;
a drop cable lift ring coupled to an electric generator and the carriage, the drop cable lift ring being configured to cause torque against the electric generator when the carriage descends;
wherein the first fulcrum and the second fulcrum are positioned on a base of the carriage;
wherein each set of projections has a first projection configured to interface with the first fulcrum and a second projection configured to interface with the second fulcrum.

8. The system of claim 7, further comprising:
fulcrum movement restrictors being removably interfaced with the first fulcrum and the second fulcrum, the fulcrum movement restrictors being configured to restrict a downward movement of the carriage when interfaced with the first fulcrum and the second fulcrum.

9. A lifting method comprising:
supporting a carriage on a structural support with a plurality of sets of projections;
positioning a plurality of items to be lifted within the carriage;
interfacing a tilting system with the carriage to tilt the carriage;
lifting the carriage responsive to tilting the carriage in a first direction or a second direction, wherein tilting the carriage with respect to the tilting system changes a center of the mass of the carriage;
supporting the carriage via a first fulcrum when the carriage is tilted in the first direction, the first fulcrum being positioned on a first side of the carriage;
supporting the carriage via a second fulcrum when the carriage is tilted in the second direction, the second fulcrum being positioned on a second side of the carriage, wherein the first fulcrum and the second fulcrum are positioned on a base of the carriage.

10. The method of claim 9, further comprising:
interfacing a first projection with the first fulcrum;
interfacing a second projection with the second fulcrum, wherein the first projection and the second projection form a set of projections.

11. The method of claim 10, wherein the structural support is a shaft extending through the carriage.

12. The method of claim 11, further comprising: positioning the first fulcrum and the second fulcrum over the first projection and the second projection.

13. The method of claim 9, further comprising: changing the center of mass of the carriage responsive to tilting the carriage in the first direction or the second direction.

14. The method of claim 9, wherein the plurality of items are the same shape, size, and weight.

15. The method of claim 9, further comprising:
coupling a drop cable lift ring coupled to an electric generator,
creating torques via the drop cable lift ring, against the electric generator when the carriage descends.

16. The method of claim 9, further comprising:
removably interfacing fulcrum movement restrictors with the first fulcrum and the second fulcrum, the fulcrum movement restrictors being configured to restrict a downward movement of the carriage when interfaced with the first fulcrum and the second fulcrum.

17. The method of claim 9, further comprising:
positioning the first fulcrum at a different vertical height than the second fulcrum responsive to tilting the carriage.

* * * * *